Dec. 15, 1931. P. CHOBANOFF 1,836,836
FISHING NET FLOAT
Filed Oct. 25, 1929
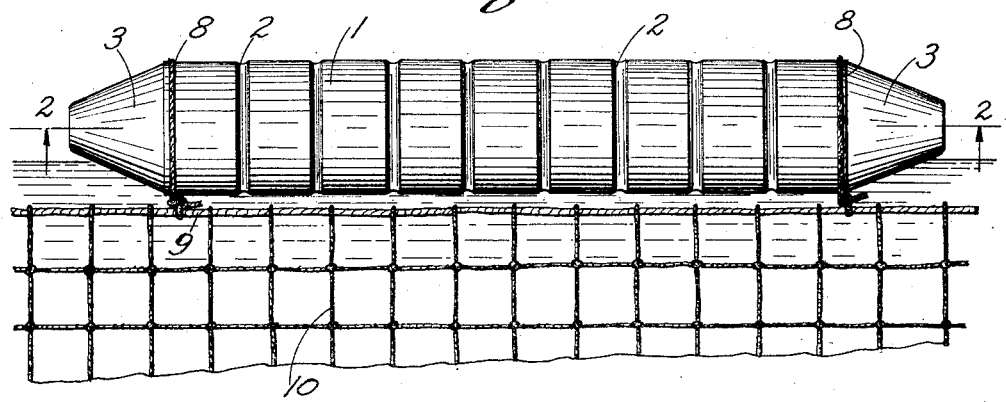
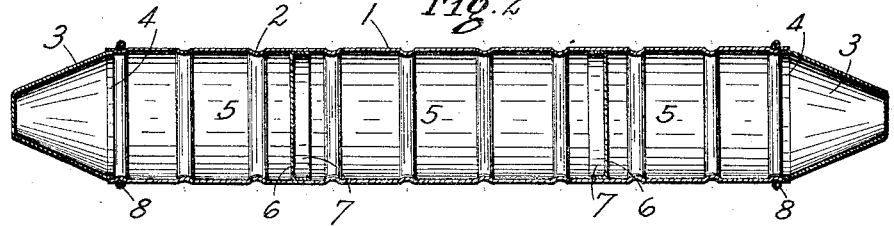
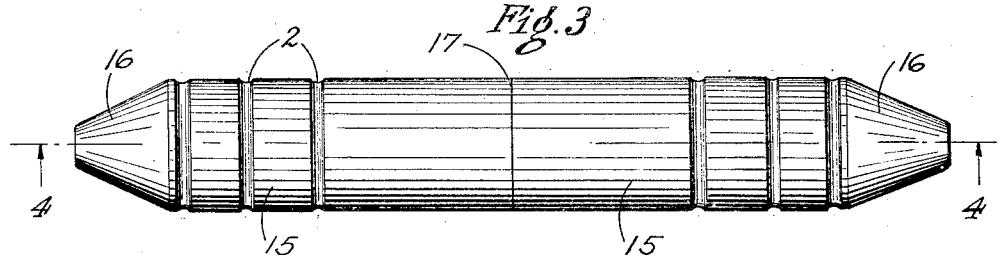
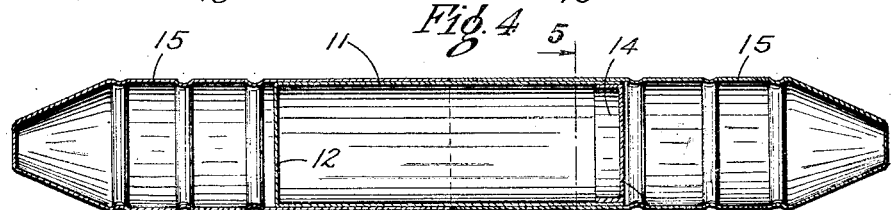
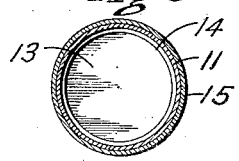 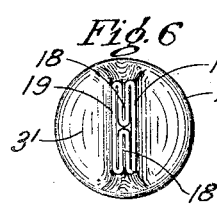
Inventor
PETER CHOBANOFF
BY
Richey & Watts
Attorneys Patented Dec. 15, 1931

1,836,836

UNITED STATES PATENT OFFICE

PETER CHOBANOFF, OF ELYRIA, OHIO

FISHING NET FLOAT

Application filed October 25, 1929. Serial No. 402,333.

This invention relates to floats, and more specifically to floats for supporting fishing nets.

One object of this invention is to provide a fishing net float economically constructed of sheet metal to replace the conventional cork float.

Another object of this invention is to provide a device of this character divided into a plurality of compartments, any one of which alone is capable of sustaining the float and net; and one which is designed to offer the minimum resistance to water or air currents.

A further object is to provide a sheet metal float having a reinforced side-wall construction, and designed to facilitate the attachment thereof to the fishing net.

In the accompanying drawings, which illustrate three embodiments of the present invention;

Fig. 1 is a side elevation of a float attached to a net;

Fig. 2 is a longitudinal section taken on the line 2—2 of Fig. 1;

Fig. 3 is a side elevation of a modified form of float;

Fig. 4 is a longitudinal section taken on the line 4—4 of Fig. 3;

Fig. 5 is a transverse section taken on the line 5—5 of Fig. 4; and

Figure 6 is an end elevation of another modification.

The float shown in Figures 1 and 2 consists of a sheet metal cylinder 1 provided with transverse corrugations or flutes 2. The ends of the cylinder are closed by frustro-conical members 3, which terminate in cylindrical flanges 4, the latter being welded or otherwise suitably affixed to the ends of the cylinder 1. If desired, the end closures may be formed integrally with the cylinder in any conventional manner. The cylinder is divided interiorly into separate water-tight compartments 5 by partition members 6, which are provided with annular cylindrical flanges 7 welded to the cylinder. Ropes 8 are passed about the opposite ends of the float, these ropes being preferably disposed in a pair of the flutes 2, and are attached to the upper strand 9 of the net 10. It is to be understood, however, that any other convenient method of attaching the partitions to the cylinder and the float to the net may be utilized if desired.

The compartments 5 are preferably designed so that any one of these compartments will sustain the float and the net in the event any of the other compartments become damaged. It will be evident that the frustro-conical shape of the end member 3 reduces the resistance offered by the float to air or water currents.

In the form of my device shown in Figures 3, 4 and 5, a cylindrical cup member 11 having an integral end closure 12 is drawn from a piece of sheet metal. The open end of the cup member is closed by means of a partition 13 having a flange 14 welded to the cup member 11. Similar cup members 15 having integral frustro-conical end members 16 are telescoped over the opposite ends of the cup member 11 and welded thereto and to each other as indicated at 17. In this form of the invention, the welding operations are reduced to two, and the device is much stronger by reason of the integral construction of the cup members. Preferably this form of the device is also provided with flutes 2, and is attached to the net in the same manner as shown in Figure 1.

Figure 6 illustrates a modified form of integral end closure in which the side wall of an open-ended cylinder 2 is folded and collapsed to form a substantially chisel-shaped end $3^1$. This is effected by pressing the side wall inwardly at diametrically opposed points to form re-entrant folds 18, and pressing the material between the folds together to form flat sides 19. The end is then soldered or welded to seal the interstices. This type of end construction may be employed with the cylinder shown in Figures 1 and 2, or without the cups 15 shown in Figures 3, 4 and 5.

While I have shown two specific embodiments of my invention, it is to be understood that this showing is illustrative only, and that numerous modifications and re-arrangements of parts can be made therein without departing from the scope of the invention as set forth in the following claims.

I claim:

1. A fishing net float comprising an inner cup member having a closure in the open end thereof, and a pair of outer cup members having their open ends telescoped over the opposite ends of said inner cup member, in such a manner as to form a plurality of chambers.

2. A fishing net float comprising a cylindrical member having closed ends, and a pair of cup members having their open ends secured to the opposite ends of said cylindrical member in such a manner as to form a plurality of separate compartments.

3. A fishing net float comprising a cylindrical member having closed ends, and a pair of cup members having integral tapered end portions secured to said cylindrical member in such a manner as to form a plurality of separate compartments.

In testimony whereof I hereunto affix my signature this 10th day of October, 1929.

PETER CHOBANOFF.